(12) United States Patent
Iwata

(10) Patent No.: US 10,944,894 B2
(45) Date of Patent: Mar. 9, 2021

(54) IMAGE CAPTURING APPARATUS, CLIENT APPARATUS, METHOD, AND STORAGE MEDIUM

(71) Applicant: CANON KABUSHIKI KAISHA, Tokyo (JP)

(72) Inventor: Toshihiro Iwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 16/106,809

(22) Filed: Aug. 21, 2018

(65) Prior Publication Data

US 2019/0068867 A1 Feb. 28, 2019

(30) Foreign Application Priority Data

Aug. 30, 2017 (JP) .............................. JP2017-166112
May 15, 2018 (JP) .............................. JP2018-093981

(51) Int. Cl.
*H04N 5/232* (2006.01)
*H04L 12/58* (2006.01)
*H04L 29/08* (2006.01)
*H04L 29/06* (2006.01)
*H04L 12/24* (2006.01)
*H04L 29/12* (2006.01)

(52) U.S. Cl.
CPC ..... *H04N 5/23206* (2013.01); *H04L 41/0873* (2013.01); *H04L 41/0883* (2013.01); *H04L 41/12* (2013.01); *H04L 51/18* (2013.01); *H04L 63/08* (2013.01); *H04L 67/16* (2013.01); *H04N 5/23293* (2013.01); *H04L 61/2015* (2013.01); *H04L 61/6068* (2013.01)

(58) Field of Classification Search
CPC .......... H04N 5/23206; H04N 5/23293; H04N 7/181; H04L 41/12; H04L 41/0873; H04L 41/0883; H04L 63/08; H04L 67/16; H04L 51/18; H04L 61/2015; H04L 61/6068
See application file for complete search history.

(56) References Cited

U.S. PATENT DOCUMENTS

2005/0254489 A1* 11/2005 Jain .................... H04L 29/12952
370/389
2007/0174441 A1 7/2007 Okamoto et al.
2010/0103457 A1 4/2010 Nakamura
(Continued)

FOREIGN PATENT DOCUMENTS

CN 103179224 A 6/2013
CN 104486457 A 4/2015
(Continued)

OTHER PUBLICATIONS

European Search Report issued in corresponding European Application No. 18187814.1 dated Dec. 20, 2018.
(Continued)

*Primary Examiner* — Yogesh K Aggarwal
(74) *Attorney, Agent, or Firm* — Venable LLP

(57) ABSTRACT

An image capturing apparatus capable of communicating with another apparatus by using a network interface outputs information indicating that a setting in which a plurality of network interfaces of the image capturing apparatus belong to the same subnet is performed if the setting in which the plurality of network interfaces belong to the same subnet is made.

17 Claims, 8 Drawing Sheets

(56) References Cited

U.S. PATENT DOCUMENTS

| | | | |
|---|---|---|---|
| 2011/0082909 A1* | 4/2011 | Ishibashi | H04L 29/04 709/217 |
| 2011/0153815 A1* | 6/2011 | Aoki | H04L 29/12264 709/224 |
| 2013/0113944 A1* | 5/2013 | Fukushima | H04N 5/225 348/207.1 |
| 2013/0275588 A1* | 10/2013 | Li | H04L 61/2046 709/224 |
| 2014/0372575 A1* | 12/2014 | Ishimura | H04L 61/2015 709/220 |
| 2018/0157512 A1* | 6/2018 | Savov | G06F 9/5077 |

FOREIGN PATENT DOCUMENTS

| | | |
|---|---|---|
| CN | 105681485 A | 6/2016 |
| JP | 2007199827 A | 8/2007 |
| JP | 2008028996 A | 2/2008 |
| JP | 2011130205 A | 6/2011 |
| JP | 2014042353 A | 3/2014 |

OTHER PUBLICATIONS

Chinese Office Action dated Mar. 20, 2020 in counterpart Chinese patent application No. 201810958955.6.
Korean Office Action issued in corresponding Korean Application No. 10-2018-0096450 dated Jan. 12, 2021.

\* cited by examiner

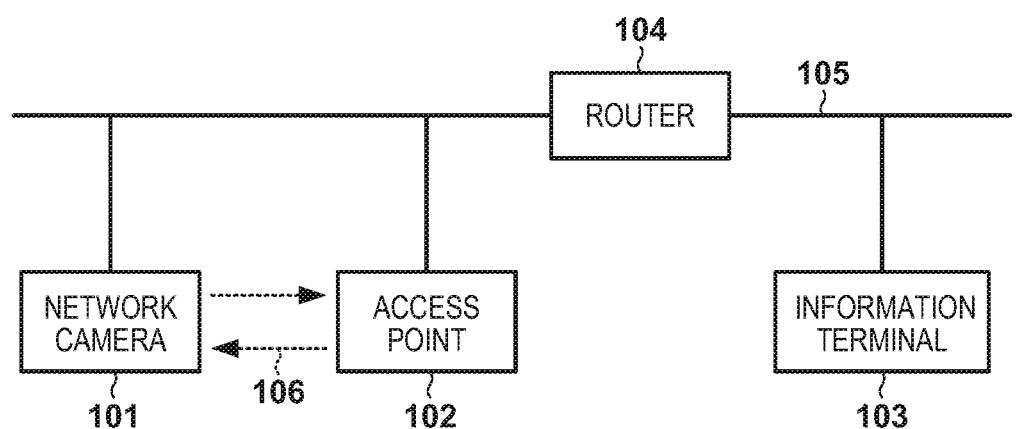
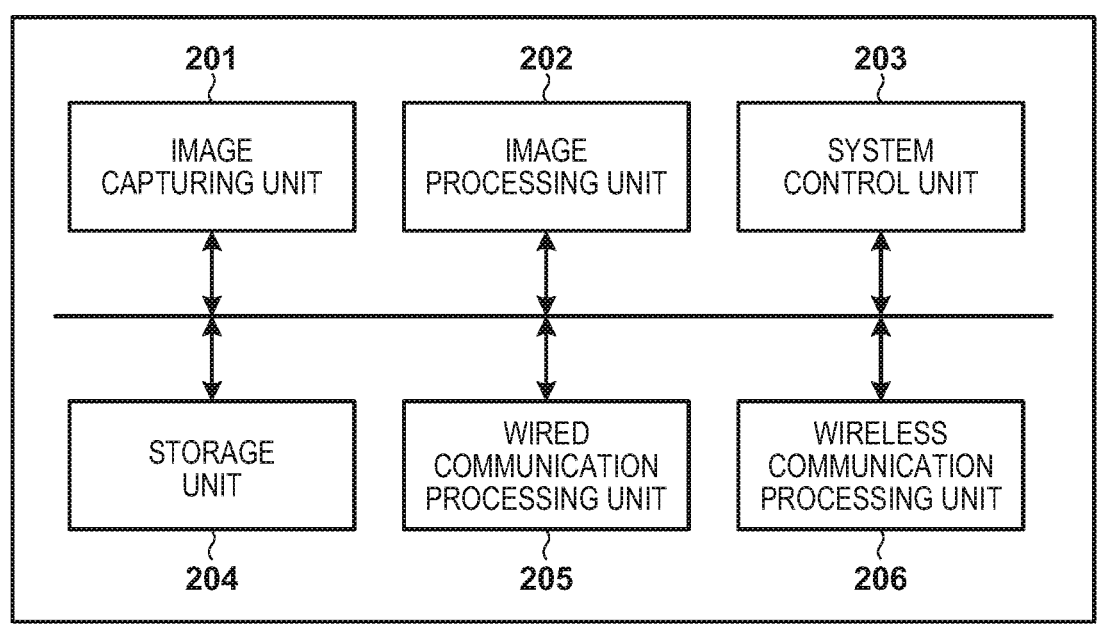

FIG. 6

| | IP ADDRESS SETTING METHOD | | |
|---|---|---|---|
| AVOIDANCE INFORMATION | AUTOMATIC ASSIGNMENT BY DHCP FUNCTION | MANUAL SETTING FROM SETTING SCREEN | SETTING FROM EXTERNAL APPLICATION |
| | ERROR LOG OUTPUT TO NONVOLATILE MEMORY | CHANGE OF SPECIFIC REGISTER VALUE | ERROR LOG OUTPUT TO NONVOLATILE MEMORY |
| AVOIDANCE OPERATION | ONLY ONE INTERFACE IS USED BASED ON MAIL NOTIFICATION TO USER OR SETTING INFORMATION | POP-UP NOTIFICATION TO SETTING SCREEN | ERROR LOG IS AUTOMATICALLY DETECTED BY PROCESS IN APPLICATION AND CONTROL COMMAND IS TRANSMITTED TO CAMERA |

NETWORK SETTING SCREEN

NETWORK 1 WIRED)

IP ADDRESS : 192.168.100.101
    SUBNET MASK : 255.255.255.0
    DEFAULT GATEWAY : 192.168.100.1

NETWORK 2 WIRED)

IP ADDRESS : 192.168.100.102
    SUBNET MASK : 255.255.255.0
    DEFAULT GATEWAY : 192.168.100.1

*SINCE NW INTERFACES ARE SET TO SAME SUBNET, SETTING CANNOT BE MADE WITH INPUT INFORMATION

[ SETTING ]

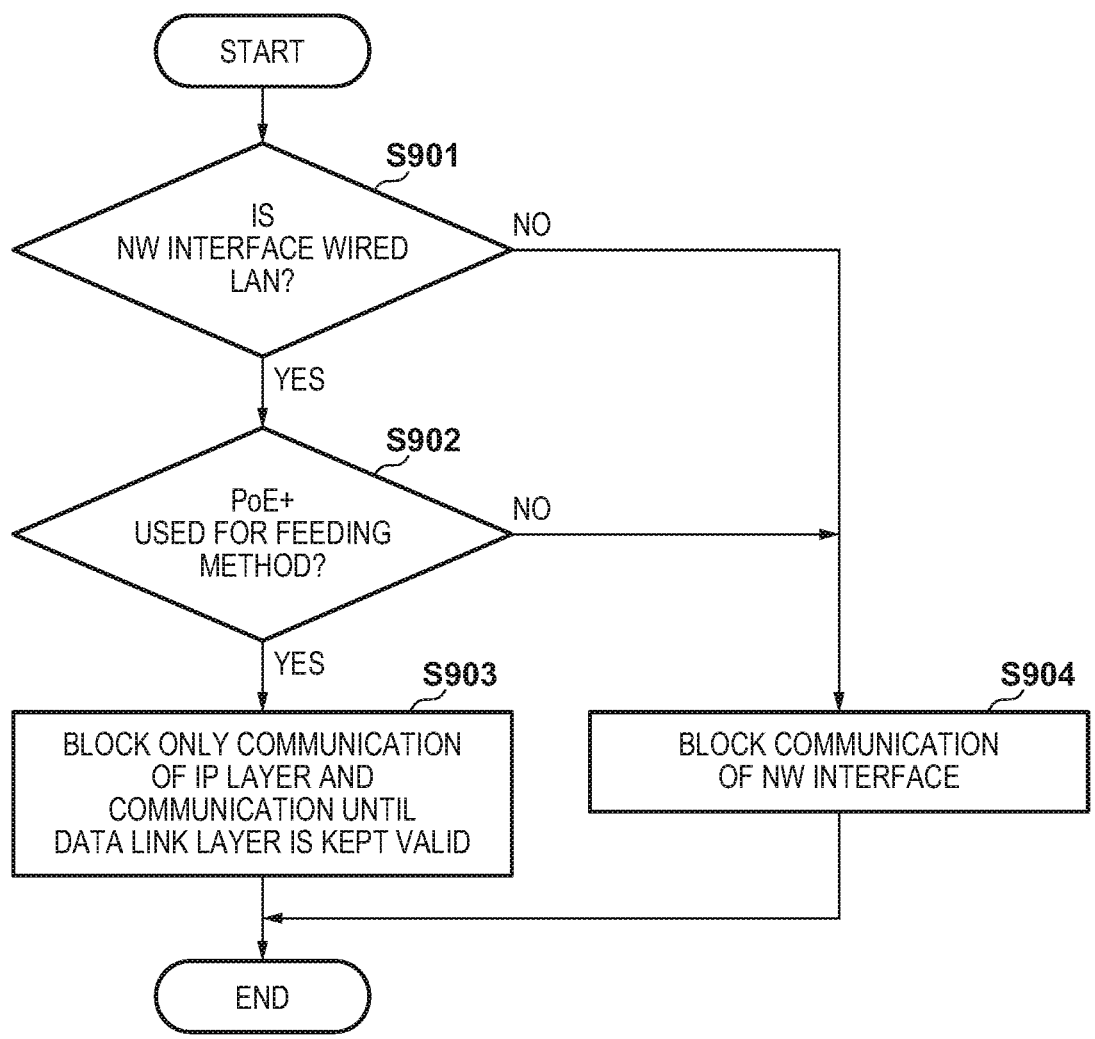

IMAGE CAPTURING APPARATUS, CLIENT APPARATUS, METHOD, AND STORAGE MEDIUM

BACKGROUND

Field

The present invention relates to a control technique of network connection between a client apparatus and an image capturing apparatus that includes a plurality of network interfaces.

Description of the Related Art

In recent years, a monitoring system using network cameras has been widespread. In these network cameras, there exists a network camera having a wireless LAN function. The network camera has a wireless communication function such as a wireless LAN, making it possible to simplify a wiring needed for its placement. Such a network camera can include not only a network interface of the wireless LAN but also a network interface of a wired LAN. However, convenience may be decreased when one apparatus includes two network interfaces. Japanese Patent Laid-Open No. 2007-199827 describes a technique of performing control so as to respond to a request signal by only one interface to solve a problem that one apparatus is recognized as two apparatuses because it includes a plurality of network interfaces.

On the other hand, in the apparatus that includes the plurality of network interfaces, it may be useful that communications are performed in parallel by using the respective network interfaces. However, convenience may be impaired depending on a network setting.

SUMMARY

The present invention provides a technique capable of performing a network setting in an apparatus including a plurality of network interfaces appropriately.

According to one aspect of the present invention, there is provided an image capturing apparatus capable of communicating with another apparatus by using a network interface, the apparatus comprising: an output unit configured to output information indicating that a setting in which a plurality of network interfaces of the image capturing apparatus belong to the same subnet is performed if the setting in which the plurality of network interfaces belong to the same subnet is made.

According to another aspect of the present invention, there is provided a client apparatus comprising: an obtaining unit configured to obtain information which is output from an image capturing apparatus capable of communicating with another apparatus by using a network interface and indicates that a setting in which a plurality of network interfaces of the image capturing apparatus belong to the same subnet is made; and an execution unit configured to execute, based on at least the information, a process for avoiding that the plurality of network interfaces belong to the same subnet.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing an example of the arrangement of a system;

FIG. 2 is a block diagram showing an example of the arrangement of a network camera;

FIG. 6 is a schematic table showing an example of information for avoiding the use of the same subnet and a method for avoiding the use;

FIG. 7 is a schematic view showing an example of a pop-up notification for avoiding the use of the same subnet;

FIG. 9 is a flowchart showing an example of an arrangement that avoids the use of the same subnet in consideration of the type of power supply.

DESCRIPTION OF THE EMBODIMENTS

Figure 3:
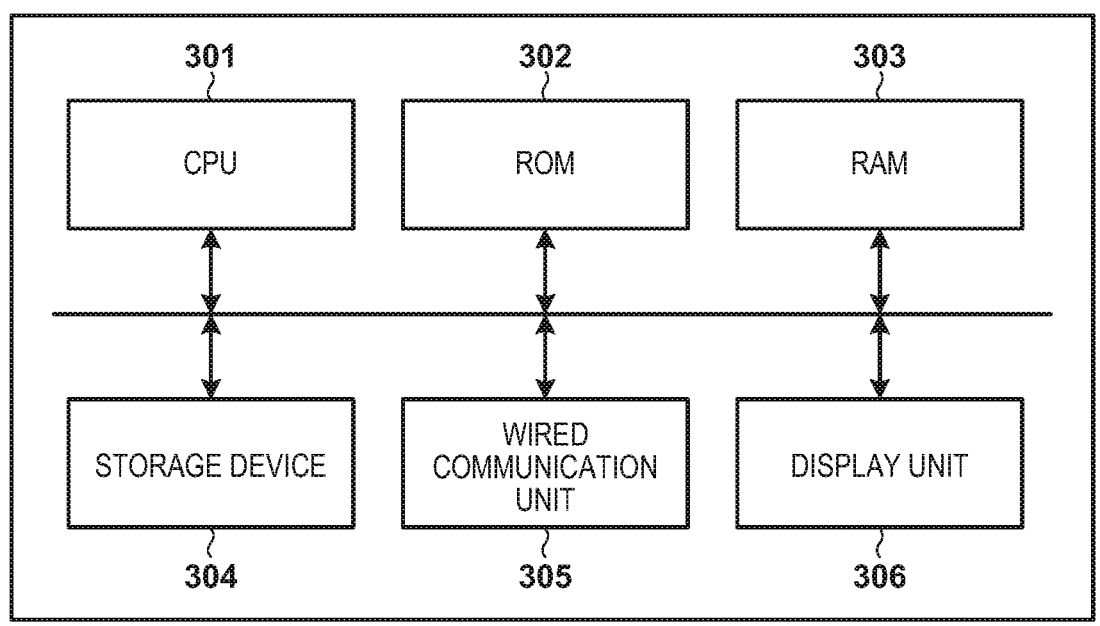
FIG. 3 is a block diagram showing an example of the arrangement of an information terminal.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Arrangement)

FIG. 1 shows an example of the arrangement of a system according to this embodiment. This system is directed to a monitoring system using a network camera 101 and includes the network camera 101, an access point 102, an information terminal 103, and a router 104. In these apparatuses, a wired network 105 and a wireless network 106 are formed. Note that for the descriptive convenience, an example in which one network camera 101, one access point 102, one information terminal 103, and one router 104 exist is shown. However, the plurality of network cameras 101, the plurality of access points 102, the plurality of information terminals 103, and the plurality of routers 104 can exist. For example, in order to capture a wide region, the plurality of network camera 101 can be distributed at different positions.

The network camera 101 is a camera that includes a plurality of network interfaces (to be referred to as "NW interfaces" hereinafter) to be communicable in a wired LAN and a wireless LAN, respectively, by using a wired communication function and a wireless communication function. Note that the network camera 101 has, as the wireless communication function, a terminal function of being connected to the access point 102 as a terminal of the wireless LAN. The access point 102 performs wireless communication with an apparatus having the terminal function of the wireless LAN such as the network camera 101. The information terminal 103 is an information processing apparatus having a function of outputting or controlling information on the network camera 101 by, for example, using an application such as a browser. A user can, for example, start a setting screen via the information terminal 103 and manually execute a setting concerning each NW interface of the network camera 101 from the setting screen. Note that the information terminal 103 can be an apparatus that includes, for example, a general-purpose processor such as a personal computer (PC), memories such as RAM, ROM, and the like and a storage device such as an HDD, and a communication circuit via, for example, the wired LAN. The information terminal 103 can, for example, obtain information from the network camera 101 via the communication circuit or a portable storage medium and execute a process for the predetermined control of the network camera 101. The router 104 operates as a default gateway of at least the network camera 101 and access point 102, and has a DHCP function of assigning an IP address to each of these apparatuses. The wired network 105 is, for example, a network such as the wired LAN using a wired line such as a cable which is used to transmit a video captured by the network camera 101 to an external recording server or the like. Note that the wired network 105 may partially include, for example, a wireless section. The wireless network 106 is a network such as the wireless LAN without the wired line such as the cable for performing wireless communication between the network camera 101 and the access point 102.

In the above arrangement, the network camera 101 can be connected to the wired LAN and the wireless LAN in parallel. For example, while recording video is ordinarily transmitted by the wired LAN with stable communication, communication for an unidentified user such as a visitor to temporarily monitor the video of a camera by the wireless LAN using an access point placed in an event venue or the like can be performed. The network camera including the plurality of NW interfaces thus uses the plurality of NW interfaces simultaneously, making it possible to operate a system flexibly in various applications. Note that for example, while transmission of the recording video needs to be restricted with high security, a requirement requested of a network that, for example, temporary monitoring needs to be open to the public so that it can be communicated by an unidentified event visitor can be different. In this case, the plurality of NW interfaces can be set so as to belong to different subnets for an appropriate setting for each network.

In such a network camera 101, however, a problem may arise at the time of, for example, the initial setting of a camera.

Many of network cameras do not abundantly include panels and buttons for controlling a camera on a camera side and often need to be connected to a network at the time of the initial setting to undergo a detailed setting by an external information processing apparatus via the network. Initial setting methods include, for example, a method for installing a camera control and management application called a VMS (Video Management System) on a client device that communicates with the network camera for use. There is also a method for accessing a setting page of the network camera and performing a camera setting by inputting the IP address of the network camera directly to a browser or the like. In either method, an arrangement to know the IP address of the network camera is needed, and a commercially available VMS generally has a camera search function. This camera search function detects a network camera present on a network by transmitting a request (discovery command) by broadcast onto a network to which the client device belongs and confirming a response to it.

A case in which the network camera including the plurality of NW interfaces exists on the network, and the NW interfaces belong to the same subnet will be examined here. In this case, the network camera returns a response by each of the NW interfaces to a request from the client device. Consequently, the application such as the VMS may erroneously detect one network camera as a plurality of network devices. Moreover, the network camera receives a control command from the client device by each of the plurality of NW interfaces, and thus convenience may be decreased due to occurrence of repetition of internal processing, omission of processing, or the like.

To cope with this, in this embodiment, if the network camera 101 including the plurality of NW interfaces monitors setting information of the respective NW interfaces and the NW interfaces are set to the same subnet, it executes a process so as to avoid using them in parallel. This makes it possible to prevent a decrease in convenience if the plurality of NW interfaces of one network camera belong to the same subnet. Examples of the arrangement of the network camera 101 that executes such a process and the process to be executed will be described below. Note that the network camera 101 is an example, and it is possible to apply the following discussion to a network device including the plurality of NW interfaces.

(Apparatus Arrangement)

FIG. 2 shows the example of the arrangement of the network camera 101. In an example, the network camera 101 includes an image capturing unit 201, an image processing unit 202, a system control unit 203, a storage unit 204, a wired communication processing unit 205, and a wireless communication processing unit 206. Note that the arrangement of FIG. 2 merely shows an example of the arrangement of the network camera 101, and various modifications such as addition of an arrangement (not shown) and deletion or change of the shown arrangement can be made.

The image capturing unit 201 includes a lens and an image sensor, captures an object, and performs conversion into an electrical signal. The image processing unit 202 performs image processing and compression encoding processing on the electrical signal converted by the image capturing unit 201, and generates image data. The system control unit 203 analyzes a command transmitted to a camera and executes a process according to the command. The system control unit 203 detects a change in parameter inside the network camera 101 and executes a process using a detection operation as an event trigger. The storage unit 204 stores a parameter for image quality adjustment and a setting value for a network setting or the like. In an example, the storage unit 204 is a nonvolatile storage device capable of holding information even if the network camera 101 is powered off and can be activated by using a value set before, for example, when the network camera 101 is reactivated. The storage unit 204 can be, for example, a memory such as a ROM or a RAM but can include any other arbitrary storage device. The image processing unit 202 and the system control unit 203 can be implemented by, for example, causing a processor such as a CPU or an MPU to execute programs stored in the storage unit 204. The image processing unit 202 and the system control unit 203 may be formed by, for example, dedicated hardware or may be formed by, for example, using a program corresponding to a programmable circuit such as an FPGA (Field Programmable Gate Array). The wired communication processing unit 205 performs network communication processing by a wired LAN. The wired communication processing unit 205 includes, for example, a circuit that performs modulation and demodulation of a signal transmitted by the wired LAN or an interface circuit for sending a signal to a wired line or receiving the signal from the wired line. The wireless communication processing unit 206 performs network communication processing by a wireless LAN. The wireless communication processing unit 206 includes, for example, a circuit that performs a process in a baseband, a circuit that converts a baseband signal into a wireless frequency signal and sends the converted signal via an antenna or receives the wireless frequency signal via the antenna and converts it into the baseband signal, or the like.

FIG. 3 shows an example of the arrangement of the information terminal 103. The information terminal 103 has the same arrangement as a general-purpose PC and includes, for example, a CPU 301, a ROM 302, a RAM 303, a storage device 304, a wired communication unit 305, and a display unit 306. The information terminal 103 executes, for example, a process for controlling the network camera 101 by executing programs stored in the ROM 302. The RAM 303 is used as, for example, a work memory at the time of the process. The display unit 306 can display, for example, a setting screen for setting the network camera 101 or the like. Note that the display unit 306 may be incorporated by the information terminal 103, or an external display of the information terminal 103 may be used. If the external display is used, the information terminal 103 may include a display control unit instead of the display unit 306. The information terminal 103 obtains information, for example, from the network camera 101 via the wired communication unit 305 and stores it in, for example, the RAM 303 or the storage device 304. Based on this obtained information, the information terminal 103 can execute the process for controlling the network camera 101.

(Process Sequence)

Figure 4:
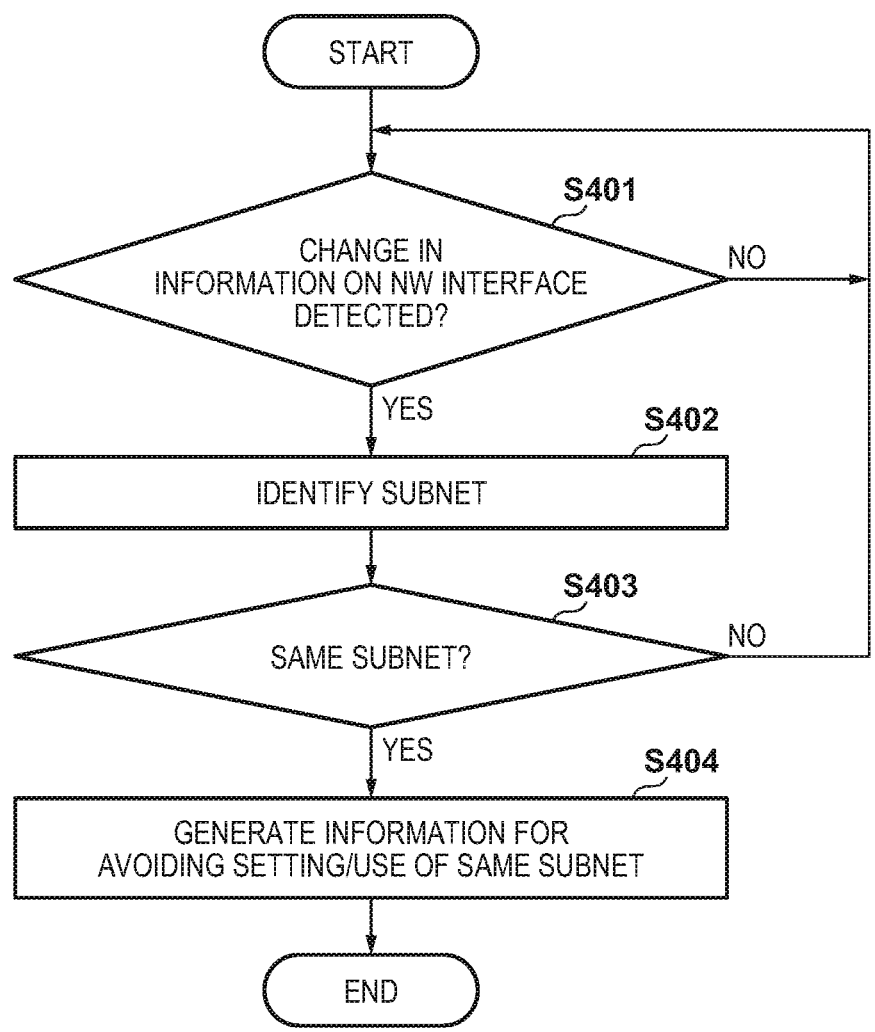
FIG. 4 is a flowchart showing the outline of a process executed by the network camera.

First, the outline of a sequence of a process executed by the network camera 101 will be described by using an example of FIG. 4.

In this process, the system control unit 203 first determines whether a change is detected in information on an NW interface (step S401). Note that the determination of whether there is the change in information on the NW interface can be, for example, a determination of whether network information of an IP address or the like corresponding to the NW interface is to be changed. The details of this detection processing will be described later. The system control unit 203 repeatedly executes monitoring and detection processing of whether there is the change in information on the NW interface while the change in information on the NW interface is not detected (NO in step S401). On the other hand, the system control unit 203 advances the process to step S402 in accordance with detection of the change in information on the NW interface (YES in step S401).

In step S402, the system control unit 203 identifies subnets in the wired communication processing unit 205 and the wireless communication processing unit 206. The system control unit 203 identifies the subnet by, for example, obtaining an IP address and a subnet mask in each communication processing unit as network information. However, the present invention is not limited to this, and the subnet may be identified by using another information or by another method. For example, information on the subnet corresponding to each communication processing unit may be stored in the storage unit 204 in advance, or the system control unit 203 may obtain the information on these subnets from the storage unit 204. If a plurality of addresses are assigned to one NW interface as in IPv6 address, the system control unit 203 identifies subnets with respect to all the addresses. However, the system control unit 203 does include a link local address as a subnet identification target and can set only a global address to the identification target.

Subsequently, the system control unit 203 compares pieces of information on the subnets for a plurality of (two) NW interfaces identified in step S402, and determines whether the wired communication processing unit 205 and the wireless communication processing unit 206 belong to the same subnet (step S403). Then, the system control unit 203 advances the process to step S404 if the wired communication processing unit 205 and the wireless communication processing unit 206 belong to the same subnet (YES in step S403); otherwise (NO in step S403), returns the process to step S401.

In step S404, the system control unit 203 generates, inside the camera, avoidance information to avoid setting the wired communication processing unit 205 and the wireless communication processing unit 206 to the same subnet or using them in the same subnet. The system control unit 203, for example, outputs an error message to a nonvolatile memory. Note that as long as the user can refer to the information when executing avoidance processing, the information may be generated in any region and, for example, it may be possible to determine, by a value of a predetermined register of the network camera 101, whether the above-described avoidance information is generated. A medium to which the above-described information is output may not exist inside the network camera 101 and, for example, in addition to the medium inside the network camera 101 or instead of this, the information may be generated in an external medium such as a nonvolatile memory card. For example, if the network camera 101 and the information terminal 103 cannot communicate via a network, the user can confirm avoidance information such as error log by removing and reading a memory card inserted in the network camera 101. Thus, the user can grasp, by confirming the avoidance information by a method according to a situation, a situation in which the plurality of NW interfaces of the network camera 101 are connected to the same subnet. This allows the user to perform, based on the generated information, an operation to avoid setting the wired communication processing unit 205 and the wireless communication processing unit 206 to the same subnet or using them in the same subnet.

An example of the detection processing for the change in information on the NW interface determined in step S401 will be described here with reference to FIG. 5. The detected change in information on the NW interface in the network camera 101 is, for example, a change in operating IP address that becomes a factor in changing a subnet to which the NW interface belongs. Note that the IP address here may be another network information that can cause the change in subnet. The change in IP address can occur by dynamically assigning an IP address by a connected DHCP server or manually setting an IP address by the user. Therefore, first, the system control unit 203 determines whether a method for setting the IP address to the NW interface is a method by using a DHCP function of the router 104 or a method for setting the IP address manually from a setting screen by the user using the information terminal 103 (step S501). Then, if the system control unit 203 determines that automatic assignment by the DHCP function is used (YES in step S501), it requests and obtains information on an IP address notified by the DHCP function for the NW interface. Then, the system control unit 203 saves the obtained information on the IP address as information on an IP address to be set (step S502). The information on the IP address to be set will be referred to as "expected setting information". On the other hand, if the system control unit 203 determines that the method for setting the IP address manually from the setting screen is used (NO in step S501), it obtains information on an IP address set on a UI of the setting screen and saves the IP address as the expected setting information (step S503).

Subsequently, the system control unit 203 obtains information on a currently set IP address which is currently set for the NW interface from the wired communication processing unit 205 or the wireless communication processing unit 206 (step S504). Then, the system control unit 203 determines whether the IP address saved as the expected setting information in step S502 or S503 and the currently set IP address obtained in step S504 match (step S505). If the system control unit 203 determines that these pieces of information match (YES in step S505), it terminates the process in FIG. 5. That is, if the system control unit 203 obtains a conclusion that there is no change in information on an NW interface to be monitored, it terminates the process without outputting any determination result. On the other hand, if the system control unit 203 determines that these pieces of information are different (NO in step S505), it determines that the change in information on the NW interface is detected (step S506). In step S401, in accordance with advancement of the process to step S506, the system control unit 203 determines that the change in information on the NW interface is detected.

Figure 5:
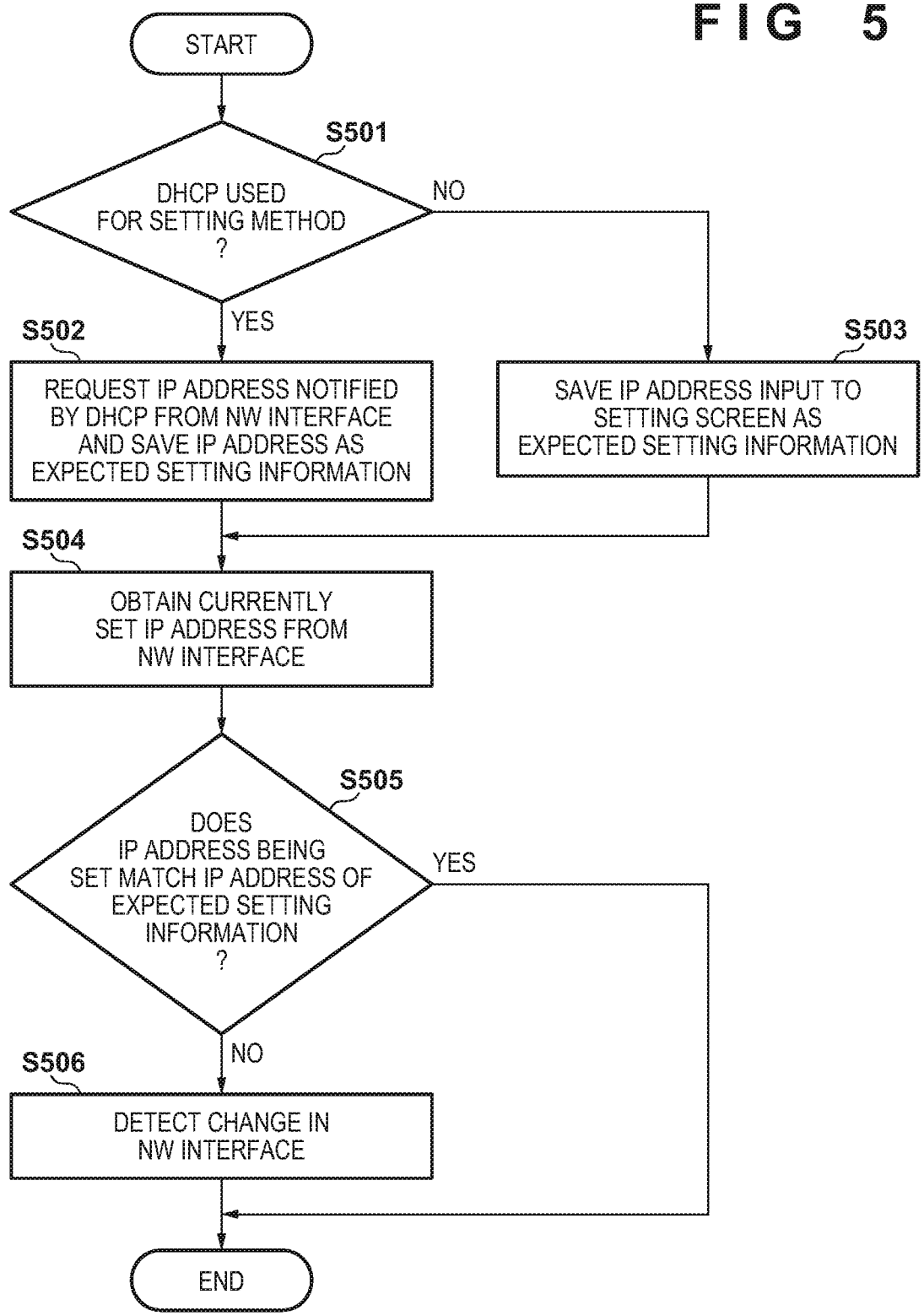
FIG. 5 is a flowchart showing an example of detection processing of a change in information on a network interface.

Note that the processing example of FIG. 5 is merely an example, and another method capable of detecting the change in information on the NW interface may be used. For example, when the information on the NW interface of the wired communication processing unit 205 or wireless communication processing unit 206 is changed, the system control unit 203 may notify the change in information on the NW interface by using a monitorable flag.

The process in FIG. 5 can be started when, for example, the system control unit 203 is notified that the setting of the IP address of the NW interface of the wired communication processing unit 205 or wireless communication processing unit 206 is performed. Note that if IP address here includes both IPv4 and IPv6, the system control unit 203 can execute the process in FIG. 5 in accordance with the setting of at least one of them that has been performed. Note that even if the setting of the IP address is performed, the same IP address as the IP address before the setting may be set as a result. In this case, note that it can be determined that there is no change in information on the NW interface. Note that the process in FIG. 5 may be executed when the setting of the IP address is not performed. For example, the system control unit 203 may periodically execute the process in FIG. 5 by obtaining information from the NW interface. Alternatively, the process in FIG. 5 may be executed in accordance with, for example, reception of a trigger from the user via the information terminal 103 or the like.

Subsequently, examples of the information generated in step S404 and operation of avoiding the setting/use of the same subnet corresponding to it will be described with reference to FIG. 6. As in a table 600 shown in FIG. 6, in an example, avoidance information and an avoidance operation can be decided in accordance with a method for changing information on an NW interface.

For example, if the information on the NW interface is changed by a method except for a user operation such as an automatic setting by the DHCP function, the setting of the NW interface can be performed when the user does not perform operation by the setting screen. Hence, a notification to the user can be made not by the setting screen but by, for example, email. This email includes, for example, information concerning a change in information on the NW interface and a confirmation request from the user of whether to accept the change in information on the NW interface. Note that the system control unit 203 does not decide the change in information on the NW interface until the user returns approval to a confirmation request of a notification mail. That is, if the IP address setting of the NW interface is changed by a DHCP, an unset IP address after receiving from the DHCP is not validated unless there is approval from the user. Note that as another avoidance operation, the system control unit 203 may perform, based on preset information, a process of automatically validating one NW interface out of the plurality of NW interfaces belonging to the same subnet. For example, since the network camera 101 is often asked for communication stability such as continuous recording distribution or the like, and stability is generally higher in wired communication than in wireless communication, only the wired communication processing unit 205 may be validated, and the wireless communication processing unit 206 may be invalidated. The network camera 101 may automatically validate or invalidate not the NW interface itself but a setting for the NW interface. That is, the network camera 101 can effectively invalidate at least some of the NW interfaces by performing control such that the NW interface itself is valid, but the setting is invalid.

If the information on the NW interface is changed via the setting screen by the user operation, the user is operating the setting screen, and thus the system control unit 203 can execute a process of outputting a pop-up display in the setting screen as on a screen 700 of FIG. 7. This pop-up display can be display for avoiding a setting in which the plurality of NW interfaces belong to the same subnet, as shown in FIG. 7. Note that the display of FIG. 7 is an example, and it can be replaced by arbitrary contents capable of transmitting, to the user, that the setting in which the plurality of NW interfaces belong to the same subnet is impossible. For example, in FIG. 7, information is presented by a character string. However, a notification that the setting in which the plurality of NW interfaces belong to the same subnet is impossible may be made by displaying a predetermined icon. Note that information may be displayed on a window opened as a setting screen, or another window for displaying information may be opened. Furthermore, information indicating that the setting in which the plurality of NW interfaces belong to the same subnet is impossible may be presented by, for example, an audio from a loudspeaker. Note that the performed setting in which the plurality of NW interfaces belong to the same subnet may be displayed, and a user operation of whether to accept the setting may be accepted.

The avoidance operation may be performed not only by a process inside the network camera 101 in the monitoring system but also by an external application installed in the information terminal 103, such as the VMS. Note that setting for the plurality of network cameras 101 on the same network can be performed at once by the external application.

An example of an avoidance operation in a setting from the external application will be described with reference to FIG. 8. First, the external application transmits a network information setting request to one or more network cameras 101 via a network (step S801). The network camera 101 sets network information in accordance with this setting request and transmits log information concerning the setting of the network information to the external application as a response to the setting request. Note that if the network camera 101 performs the setting of the network information before receiving the setting request, it can transmit log information concerning the network information that has already been set to the external application. For example, if error log is stored in a nonvolatile memory, the network camera 101 transmits information that includes the error log to the external application.

The external application obtains log information from each network camera 101 as a response to the setting request transmitted in step S801 (step S802) and determines whether error log is detected in the obtained log information (step S803). Then, if the external application detects the error log (YES in step S803), it advances the process to step S804. If the external application does not detect the error log (NO in step S803), it terminates the process assuming that the setting is made normally for all the cameras. In step S804, the external application transmits a cancel request for canceling (invalidating) the performed network setting to each camera which detects the error log and notifies the user that setting cannot be made by screen display or the like. Note that the external application may transmit a request to invalidate at least some of settings for the plurality of NW interfaces belonging to the same subnet, for example, to validate only a setting for one of the plurality of NW interfaces or the like. This allows the external application to execute a setting to avoid setting the plurality of NW interfaces of the network camera to the same subnet or using them in the same subnet. The external application may transmit a request to invalidate or validate the NW interfaces themselves for at least some of the NW interfaces of the network camera.

Figure 8:
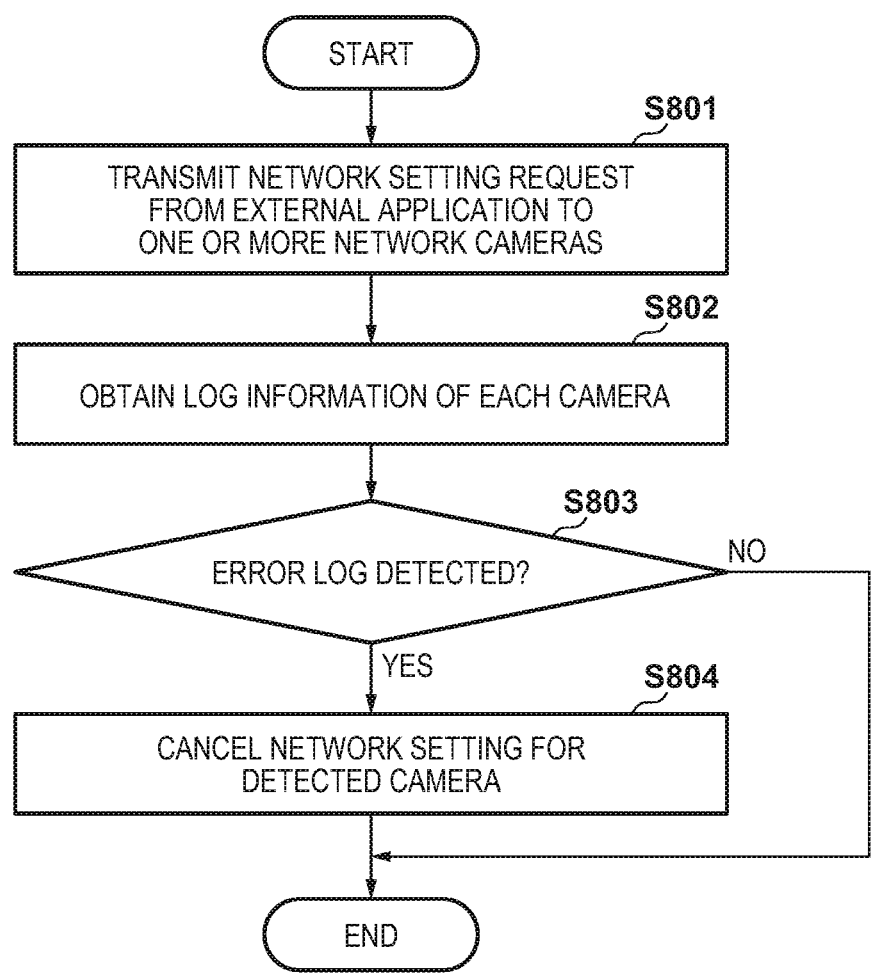
FIG. 8 is a flowchart showing an example of a process of avoiding the use of the same subnet by an external application.

Note that the process shown in FIG. 8 is an example, and another method performed by the external application to avoid setting the plurality of NW interfaces to the same subnet or using them in the same subnet may be used. For example, the network camera 101 may hold the network setting by the setting request in step S801 as an undecided setting and may decide the network setting if the cancel request from the external application has not been received for a predetermined period. Alternatively, the external application may transmit a message for deciding the network setting to the network camera 101 that does not detect the error log. In this case, the network camera 101 may, for example, hold the network setting by the setting request in step S801 as the undecided setting and cancel the undecided network setting if the message has not been received for the predetermined period. The information terminal 103 may wait for a user operation for preventing the plurality of NW interfaces from belonging to the same subnet by displaying the screen as in FIG. 7.

The network camera 101 can use a hub of PoE+ (Power of Ethernet Plus) as a power supply. PoE+ is the standard of Ethernet® that performs communication and power supply by one LAN cable. In PoE+, information is collected by transmitting packet data to a multicast address periodically by using a protocol called an LLDP (Link Layer Discovery Protocol). Then, if communication by the LLDP cannot be performed, feed from PoE+ is stopped. Therefore, the network camera 101 needs to perform, in consideration of the type of connected power supply, an operation of avoiding the use of the same subnet while making it possible to ensure communication of PoE+ if PoE+ is used.

An example of an avoidance operation in consideration of the type of power supply will be described with reference to FIG. 9. As the avoidance operation here, only one of the NW interfaces belonging to the same subnet is validated, and the remaining NW interfaces are restricted, for example, invalidated.

First, the system control unit 203 determines whether an NW interface selected as a restriction target is a wired LAN (step S901). Then, if the system control unit 203 determines that the NW interface is the wired LAN (YES in step S901), it advances the process to step S902. On the other hand, if the system control unit 203 determines that the used NW interface is not the wired LAN (NO in step S901), PoE+ is not used, and therefore the system control unit 203 blocks communication by the NW interface (step S904). In step S902, the system control unit 203 determines whether the network camera 101 is fed by PoE+. Then, if the system control unit 203 determines that the network camera 101 is fed by PoE+ (YES in step S902), it advances the process to step S903. On the other hand, if the system control unit 203 determines that the network camera 101 is not fed by PoE+ (NO in step S902), it blocks communication by the NW interface (step S904). Note that the determinations in steps S901 and S902 may be performed in parallel. In step S903, the system control unit 203 blocks communication of an upper layer equal to or higher than an IP layer while keeping communication of a lower layer equal to or lower than a data link layer valid. Since the LLDP operates in the data link layer, it is possible to maintain a fed state without influencing packet data transmission of the LLDP by the process in step S903. On the other hand, since communication in the upper layer equal to or higher than the IP layer is blocked, it is possible to avoid using the NW interface of the restriction target in the same subnet as an NW interface of a non-restriction target.

Note that the process shown in FIG. 9 is an example, and another process of avoiding the use of the plurality of NW interfaces in the same subnet while maintaining a state in which the network camera 101 is fed may be used. For example, if the plurality of NW interfaces are set to the same subnet, a process so as to preferentially validate an NW interface used to transfer packet data of the LLDP and invalidate the remaining interfaces may be performed. If the network camera 101 includes another power feed source for backup or the like in case of power failure, the user may be notified of switching of feeding methods, and communication of the NW interface may be blocked by switching the feeding methods.

Note that upon recognizing that the setting in which the plurality of NW interfaces belong to the same subnet is performed, the user can, for example, execute a process of changing a subnet to which one of the NW interfaces belongs by changing an access point to which the wireless LAN is connected or the like. According to this, the plurality of NW interfaces belong to different subnets, making it possible to perform a network setting capable of using the plurality of NW interfaces effectively. In some cases, the user may allow the plurality of NW interfaces to belong to the same subnet. In this case, the network camera 101 may be configured to communicate by one NW interface with respect to, for example, data, on which overlapping communication is not to be performed, such as a control command of a camera. For example, the network camera 101 can be configured to transmit/receive the control command and transmit a captured image by a wired communication interface, and only transmit the captured image by a wireless communication interface.

Thus, according to this embodiment, if the plurality of NW interfaces of one network camera belong to the same subnet, it is possible, by outputting this, to prevent a network from being arranged in an unintended form. In particular, if the plurality of NW interfaces of one apparatus should not belong to one subnet, the user can be notified automatically that, for example, it is impossible to invalidate at least some NW interfaces or execute such a setting. This makes it possible to perform an appropriate network setting requested by the user.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-166112, filed Aug. 30, 2017, and 2018-093981, filed May 15, 2018 which are hereby incorporated by reference herein in their entirety.

What is claimed is:

1. An image capturing apparatus capable of communicating with another apparatus by using a plurality of network interfaces, the apparatus comprising:
a computer executing instructions that, when executed by the computer, cause the computer to function as:
a determining unit configured
to detect, through at least one of the plurality of network interfaces, whether a setting for at least one of the plurality of network interfaces is changed, and
to determine whether each of the plurality of network interfaces belongs to a same subnet, if it is detected that a setting for at least one of the plurality of network interfaces is changed; and
an output unit configured to output information including an error message indicating that each of the plurality of network interfaces belongs to the same subnet if it is determined that each of the plurality of network interfaces belongs to the same subnet.

2. The apparatus according to claim 1, wherein the instructions, when executed by the computer, further cause the computer to invalidate at least some of the plurality of network interfaces or at least a part of the setting based on at least the information.

3. The apparatus according to claim 1, wherein the instructions, when executed by the computer, further cause the computer to validate only one of the plurality of network interfaces which is set so as to belong to the same subnet.

4. The apparatus according to claim 3, wherein a process of validating only one of the plurality of network interfaces is performed automatically if the setting is not one that was performed manually by a user.

5. The apparatus according to claim 2, wherein further based on a request from outside of the image capturing apparatus, one of the at least some of the plurality of network interfaces and the at least a part of the setting is invalidated.

6. The apparatus according to claim 1, wherein the output unit outputs an email for notifying a user of the information.

7. The apparatus according to claim 6, wherein the instructions, when executed by the computer, further cause the computer to validate the setting in accordance with acceptance of approval of the user for the email.

8. The apparatus according to claim 6, wherein the output unit outputs the email if the setting is not one that was performed manually by the user.

9. The apparatus according to claim 1, wherein the output unit causes a setting screen for setting a network interface of the image capturing apparatus to display the information.

10. The apparatus according to claim 9, wherein the output unit displays the information on the setting screen if the setting is one that was performed manually by a user.

11. The apparatus according to claim 1, wherein the plurality of network interfaces include network interfaces for wireless communication and wired communication.

12. A client apparatus comprising:
a computer executing instructions that, when executed by the computer, cause the computer to function as:
an obtaining unit configured to obtain first information which is output from an image capturing apparatus capable of communicating with another apparatus by using a plurality of network interfaces and which includes an error message indicating that each of the plurality of network interfaces of the image capturing apparatus belongs to a same subnet; and
an execution unit configured to display, on a screen, second information indicating that a setting for at least one of the plurality of network interfaces cannot be performed, based on at least the first information, if an operation for the setting has been executed by a user via the screen and the first information is obtained by the obtaining unit.

13. The apparatus according to claim 12, wherein the execution unit transmits a request for canceling the setting to the image capturing apparatus.

14. A method performed by an image capturing apparatus capable of communicating with another apparatus by using a network interface, the method comprising:
detecting, through at least one of the plurality of network interfaces, whether a setting for at least one of the plurality of network interfaces is changed;
determining whether each of the plurality of network interfaces belongs to a same subnet, if it is detected that a setting for at least one of the plurality of network interfaces is changed; and
outputting information including an error message indicating that each of the plurality of network interfaces of the image capturing apparatus belongs to the same subnet if it is determined that each of the plurality of network interfaces belongs to the same subnet.

15. A method performed by a client apparatus, the method comprising:
   obtaining first information which is output from an image capturing apparatus capable of communicating with another apparatus by using a plurality of network interfaces and which includes an error message indicating that each of the plurality of network interfaces of the image capturing apparatus belongs to a same subnet; and
   displaying, on a screen, second information indicating that a setting for at least one of the plurality of network interfaces cannot be performed, based on at least the first information, if an operation for the setting has been executed by a user via the screen and the first information is obtained.

16. A non-transitory computer-readable storage medium that stores a program for causing a computer comprised in an image capturing apparatus capable of communicating with another apparatus by using a plurality of network interfaces to:
   detect, through at least one of the plurality of network interfaces, whether a setting for at least one of the plurality of network interfaces is changed;
   determine whether each of the plurality of network interfaces belongs to a same subnet, if it is detected that setting for at least one of the plurality of network interfaces is changed; and
   output information including an error message indicating that each of the plurality of network interfaces of the image capturing apparatus belongs to the same subnet if it is determined that each of the plurality of network interfaces belongs to the same subnet.

17. A non-transitory computer-readable storage medium that stores a program for causing a computer comprised in a client apparatus to:
   obtaining first information which is output from an image capturing apparatus capable of communicating with another apparatus by using a plurality of network interfaces and which includes an error message indicating that each of the plurality of network interfaces of the image capturing apparatus belongs to a same subnet; and
   displaying, on a screen, second information indicating that a setting for at least one of the plurality of network interfaces cannot be performed, based on at least the first information, if an operation for the setting has been executed by a user via the screen and the first information is obtained.

* * * * *